(12) United States Patent
Muranaka et al.

(10) Patent No.: US 7,659,348 B2
(45) Date of Patent: Feb. 9, 2010

(54) CROSSLINKED (METH)ACRYLAMIDE PARTICLES, PROCESS FOR THEIR PRODUCTION AND THEIR USE

(75) Inventors: Kazuaki Muranaka, Shunan (JP); Maho Yamanaka, Isehara (JP); Kosuke Araki, Shunan (JP)

(73) Assignee: Tosoh Corporation, Shunan-shi (JP)

( * ) Notice: Subject to any disclaimer, the term of this patent is extended or adjusted under 35 U.S.C. 154(b) by 666 days.

(21) Appl. No.: 11/247,157

(22) Filed: Oct. 12, 2005

(65) Prior Publication Data

US 2006/0084765 A1 Apr. 20, 2006

(30) Foreign Application Priority Data

Oct. 14, 2004 (JP) .............................. 2004-299974
Oct. 14, 2004 (JP) .............................. 2004-299975

(51) Int. Cl.
  C08F 20/56 (2006.01)
  C08C 19/22 (2006.01)
  G01N 30/02 (2006.01)
  B01D 15/34 (2006.01)
(52) U.S. Cl. .................... 525/329.4; 525/374; 525/379; 422/70; 210/656
(58) Field of Classification Search .............. 525/329.4, 525/374, 379; 422/70; 210/656
See application file for complete search history.

(56) References Cited

U.S. PATENT DOCUMENTS

| | | |
|---|---|---|
| 2,978,432 A | 4/1961 | Graulich et al. |
| 4,198,495 A | 4/1980 | Sekmakas et al. |
| 5,219,969 A * | 6/1993 | Uhl et al. .................... 526/304 |

* cited by examiner

*Primary Examiner*—Robert Rábago
(74) *Attorney, Agent, or Firm*—Oblon, Spivak, McClelland, Maier & Neustadt, L.L.P.

(57) ABSTRACT

Crosslinked (meth)acrylamide particles in the form of substantially spherical fine particles having particle sizes of from 1 to 1000 μm made of a polymer of a N-alkoxymethyl(meth)acrylamide and a polyfunctional unsaturated monomer copolymerizable with the N-alkoxymethyl(meth)acrylamide, wherein the structural units derived from the N-alkoxymethyl(meth)acrylamide are crosslinked by a crosslink having a structure represented by the formula 1 (wherein X is hydrogen or a methyl group, and each of $R_8$ and $R_9$ is another structural unit derived from the N-alkoxymethyl(meth)acrylamide and bonded to the nitrogen atom in another structural unit derived from the N-alkoxymethyl(meth)acrylamide monomer via a methylene group).

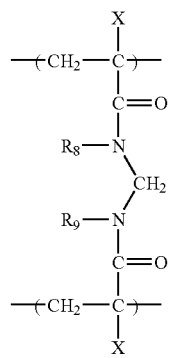

Formula 1

24 Claims, 3 Drawing Sheets

CROSSLINKED (METH)ACRYLAMIDE PARTICLES, PROCESS FOR THEIR PRODUCTION AND THEIR USE

The present invention relates to crosslinked (meth)acrylamide particles.

Particles of polymers containing a (meth)acrylamide monomer (hereinafter referred to (meth)acrylamide particles) as a monomer component are widely used in ink binders, surface treatments, cosmetics by virtue of their high hydrophilicity, excellent water retention and low biological toxicity. Especially, because they show little hydrophobic interaction with samples in liquid chromatography using aqueous eluents, they are excellent materials for supports used in purification of proteins and nucleic acids by nature.

As conventional hydrophilic particles, particles of crosslinked polysaccharides such as cellulose, dextran and agarose have been widely known. Crosslinked polysaccharide particles are prepared by suspending an aqueous solution containing a polysaccharide and a crosslinker such as an epoxy compound or dialdehyde in an organic solvent to form an inverse suspension and crosslinking the polysaccharide with the crosslinker.

(Meth)acrylamide particles are prepared by polymerization, usually by inverse suspension polymerization, of water-soluble (meth)acrylamide (U.S. Pat. No. 4,070,348 (claim 6), U.S. Pat. No. 4,190,713 (Abstract), U.S. Pat. No. 4,511,694 (claim 1) and JP-A-59-232101 (claim 10)) or by other known methods such as dispersion polymerization in an organic solvent which allows formation of monodisperse (meth)acrylamide particles having uniform particle size (U.S. Pat. No. 4,988,568 (Abstract and claim 3)), polymerization in supercritical carbon dioxide (U.S. Pat. No. 4,748,220 (Abstract and claim 4)) and atomization (JP-A-2003-211003 (claim 1)).

An N-alkoxymethyl(meth)acrylamide is a self-crosslinkable monomer which releases the alkoxy group upon treatment with an acid catalyst and readily undergoes self-crosslinking or forms a bond with an amido group, an amino group or the like. Therefore, it is used for textile finishing (U.S. Pat. No. 5,219,969 (Abstract) and U.S. Pat. No. 5,314,943 (Background Art)) or as dispersants in colloids (U.S. Pat. No. 5,385,971 (Detailed Description of the Invention) and U.S. Pat. No. 6,316,568 (claim 3)) and as a film-forming material (JP-A-51-8343 (claim 3 and Example 5) and U.S. Pat. No. 4,107,156 (Example 15)).

(Meth)acrylamide particles are used in various fields by virtue of their properties as hydrophilic particles. They, however, have the problem that limited means are available for introduction of functional groups and the problem that they are mechanically weak. Their mechanical weakness creates a problem which has yet to be solved that they are difficult to obtain as fine particles of 50 μm or less, especially about 10 μm in size so as to be used in liquid chromatography.

Another problem is that it is difficult to control the particle size in production of (meth)acrylamide particles. This is because in inverse suspension polymerization commonly used for production of (meth)acrylamide particles, particle size control is difficult, and seeding is not available to production of (meth)acrylamide particles, though it affords monodisperse particles of uniform particle size when used in normal suspension polymerization. Though dispersion polymerization can give (meth)acrylamide particles having uniform particle size, there is a problem that the resulting particles are restricted within a narrow particle size range of 10 μm or below and that the degree of crosslinking cannot be changed freely because the particle size depends on the ratio of the crosslinkable monomer and (meth)acrylamide and decreases as the degree of crosslinking increases.

The object of the present invention is to provide crosslinked (meth)acrylamide particles having various substituents, especially highly hydrophilic and mechanically strong crosslinked (meth)acrylamide particles having excellent properties as a packing for liquid chromatography. Another object of the present invention is to provide a process for easily producing crosslinked (meth)acrylamide particles having an arbitrary degree of crosslinking and various functional groups by introducing substituents into polymer particles obtained by normal suspension polymerization. Still another object of the present invention is to provide a process for producing monodisperse crosslinked (meth)acrylamide particles having an arbitrary degree of crosslinking, which have not been obtained by other is polymerization methods, by seed polymerization.

The present invention provides crosslinked (meth)acrylamide particles in the form of substantially spherical fine particles having particle sizes of from 1 to 1000 μm made of a polymer of a N-alkoxymethyl(meth)acrylamide and a polyfunctional unsaturated monomer copolymerizable with the N-alkoxymethyl(meth)acrylamide, wherein the structural units derived from the N-alkoxymethyl(meth)acrylamide are crosslinked by a crosslink having a structure represented by the formula 1 (wherein X is hydrogen or a methyl group, and each of $R_8$ and $R_9$ is another structural unit derived from the N-alkoxymethyl(meth)acrylamide and bonded to the nitrogen atom in another structural unit derived from the N-alkoxymethyl(meth)acrylamide monomer via a methylene group). The crosslinked (meth)acrylamide particles have high hydrophilicity attributable to the (meth)acrylamide and high mechanical strength which has not been attained before, and therefore, are available as small particles having particles sizes down to about 10 μm especially useful as a packing for liquid chromatography.

Formula 1

The present invention also provides crosslinked (meth)acrylamide particles in the form of polymer particles having particle sizes of from 1 to 1000 μm, which contains units derived from an N-alkoxymethyl(meth)acrylamide monomer represented by the formula 2 (wherein X is hydrogen or a methyl group, $R_1$ is an alkyl group having at least 4 carbon atoms) and units derived from a polyfunctional unsaturated monomer copolymerizable with the monomer represented by the formula 2, wherein a substituent represented by the formula 3 (wherein $R_2$ is H, an alkyl group having at most 3 carbon atoms or an alkyl group having at most 3 carbon atoms and substituted with at least one hydroxyl group, $R_3$ is H, $NH_2$, an alkyl group having from 1 to 18 carbon atoms, a phenyl group, a linear, branched or cyclic alkyl group having at most 24 carbon atoms and substituted with at least one hydroxyl group or —CH$_2$—CO—NH$_2$, or R$_3$ may be a structural unit derived from the N-alkoxymethyl(meth)acrylamide monomer and bonded to the nitrogen atom in another structural unit derived from the N-alkoxymethyl(meth)acrylamide monomer via a methylene group, and A is a polymer particle) and/or the formula 4 (wherein each of R$_4$ and R$_5$ is H, an alkyl group having at most 6 carbon atoms, a phenyl group, a naphthyl group, an alkyl group having at most 6 carbon atoms and substituted with at least one hydroxyl group, —CH$_2$COOH, —CH$_2$SO$_3$H, —CH$_2$CH$_2$SO$_3$H, —(CH$_2$)$_n$—PO—(OH)$_2$ (wherein n is an integer of from 1 to 4), —CHR$_6$—PO—(OH)$_2$ (R$_6$ is a linear alkyl group having from 1 to 3 carbon atoms), —CHR$_7$—COOH (wherein R$_7$ is a pendant amino acid group), an oligopeptide residue, a cytidine residue, a guanidine residue, a melamine residue, a benzoguanamine residue, polyethyleneimine or polyallyamine, or each or R$_4$ and R5 may be a structural unit derived from the N-alkoxymethyl(meth)acrylamide monomer and bonded to the nitrogen atom in another structural unit derived from the N-alkoxymethyl(meth)acrylamide monomer via a methylene group, and A is a polymer particle) is introduced into units derived from the N-alkoxymethyl(meth)acrylamide monomer represented by the Formula 2.

Formula 2

Formula 3

Formula 4

The substituents in the crosslinked (meth)acrylamide particles can be introduced from a compound having an amido or amino group after elimination of the alkoxy group by the action of an acid catalyst through the reactions represented by the formula 5 or 6, and it is easy to introduce various functional groups into the polymer particles of the present invention.

Formula 5

In the Formula 5, R$_1$, R$_2$ and R$_3$ are the same as defined in the Formula 2 and the Formula 3, and A is a polymer particle.

Formula 6

In the Formula 6, R$_1$, R$_4$ and R$_5$ are the same as defined in the Formula 2 and the formula 4, and A is a polymer particle.

When a highly hydrophilic amide compound such as formamide and lactamide as a compound having an amido group is introduced into the crosslinked particles, highly hydrophilic porous particles will be obtained. Use of a polyfunctional amide compound such as urea affords highly hydrophilic crosslinked particles having high mechanical strength that has not been attained before which can be available as small particles useful especially as packing for liquid chromatography. Introduction of a compound having an amido group and an ion exchange group affords crosslinked particles which serve as an ion exchanger containing a (meth) acrylamide monomer as a monomer component. Further, it is possible to introduce polyacrylamide or various copolymers of acrylamide as compounds having an amido group.

It is also possible to introduce a compound having a N—H containing amino group instead of an amido group. Use of a compound having another ion exchange group in addition to a compound having an amino group affords a betaine-type ion exchanger. For example, when a compound having a N—H containing amino group has a carboxylic acid group, a sulfonic acid group or a phosphoric acid group, the amino group becomes attached to the polymer particles of the present invention to make a betaine-type ion exchanger having both cation exchange groups and amino groups as anion exchange groups.

The crosslinked (meth)acrylamide particles are readily produced by suspension polymerization of an N-alkoxymethyl(meth)acrylamide monomer and a polyfunctional unsaturated polymer copolymerizable with the N-alkoxymethyl (meth)acrylamide monomer and self-crosslinking the resulting polymer particles (hereinafter referred to as the present polymer particles) by treating a dispersion of the present polymer particles in an organic solvent with an acid catalyst as represented by the formula 7 (wherein R$^1$ is an alkyl group having at least 4 carbon atoms, m is an integer of at least 1, and A is a polymer particle). The use of an oil-soluble N-alkoxymethyl(meth)acrylamide monomer in the suspension polymerization enables suspension polymerization in a normal suspension system, and the use of the seeding technique enables production of crosslinked acrylamide particles having a monodisperse particle size distribution.

Formula 7

Now, the present invention will be described in detail.

The crosslinked (meth)acrylamide particles of the present invention having particle sizes of from 1 to 1000 μm comprises structural units derived from an N-alkoxymethyl (meth)acrylamide monomer and structural units derived from a polyfunctional unsaturated monomer and have at most two crosslinks, per one structural unit derived from the (meth) acrylamide monomer, formed by bonding the amido nitrogen atom in a structural unit derived from the N-alkoxymethyl (meth)acrylamide monomer to the amido nitrogen atom in another structural unit. It is possible to introduce various functional groups via the N-alkoxymethyl groups into the particles by forming these crosslinks in the presence of a compound having an amido or amino group.

Though the crosslinked (meth)acrylamide particles of the present invention may be produced by crosslinking (meth) acrylamide particles obtained by inverse suspension polymerization with formalin or the like, they are produced preferably by forming the present polymer particles from an oil-soluble N-alkoxymethyl(meth)acrylamide monomer and the polyfunctional unsaturated monomer by normal suspension polymerization with seeding and self-crosslinking the present polymer particles in an organic solvent or introducing substituents in the presence of an acid catalyst not only because the seeding technique affords particles having a monodisperse particle size distribution but also because side reactions such as hydrolysis are rare.

Because the N-alkoxymethyl(meth)acrylamide monomer to be used for production of the crosslinked (meth)acrylamide particles of the present invention is preferably oil-soluble, the N-alkoxymethyl group has to be a hydrophobic group preferably having a linear alkyl group having at least 4 carbon atoms. Especially, the carbon chain in the alkoxy group is preferably a $C_{4-8}$ linear alkyl group, considering the swelling, when polymer particles are formed by seed polymerization.

The polyfunctional unsaturated monomer used for production of the crosslinked (meth)acrylamide particles of the present invention has to be an oil-soluble monomer copolymerizable with the N-alkoxymethyl(meth)acrylamide monomer. For example, (meth)acrylate esters including ethylene glycol di(meth)acrylate, diethylene glycol di(meth)acrylate, polyethylene glycol di(meth)acrylate, glycerin di(meth)acrylate and glycerin tri(meth)acrylate, bismaleimides such as methylenebismaleimide, N,N'-(4-methyl-1,3-phenylene)bismaleimide, N,N'-(phenylene)bismaleimide and N,N'-(sulfonyl-di-m-phenylene)bismaleimide, divinylbenzene, triallyl isocyanurate and methylenebisacrylamide may be mentioned. It is used in such an amount that the molar ratio of the N-alkoxymethyl(meth)acrylamide to the polyfunctional unsaturated monomer is from 99.99:0.01 to 50:50, preferably from 99.95:0.05 to 98:2, in order to obtain strong particles and lessen the hydrophobic effect of the polyfunctional unsaturated monomer.

In addition to the N-alkoxymethyl(meth)acrylamide monomer and the polyfunctional unsaturated monomer, other monomers may be copolymerized. However, because such additional monomers have to be hydrophobic monomers which add to the hydrophobicity of the crosslinked (meth) acrylamide particles, it is unfavorable to add other monomers in order to obtain hydrophilic particles by taking advantage of the hydrophilicity of the N-alkoxymethyl(meth)acrylamide as a monomer component.

The particle size of the present polymer particles is, though arbitrary, preferably from 1 to 1000 μm, particularly from 5 to 200 μm, for use as a packing for in liquid chromatography.

The present polymer particles readily self-crosslink in the presence of an acid catalyst in an organic solvent through reaction between the N-alkoxymethyl groups to give highly crosslinked acrylamide particles.

In the present polymer particles, a compound having an amido group having at least one N—H bond on the nitrogen atom can be easily introduced in the presence of an acid catalyst in an organic solvent. The alkoxy group in the N-alkoxymethylamido group is eliminated, and the nitrogen atom in the amido group in the present polymer particles becomes attached to the amido nitrogen atom in the compound having an amido group via a methylene group. Any compound having an arbitrary substituent can be introduced as long as it is soluble in the organic solvent to be used.

Because a compound having an amido group is introduced via N-alkoxymethyl groups in the present polymer particles, amido groups can be introduced into the present polymer particles in a ratio (molar ratio) of at most 1:1 in relation to the N-alkoxymethyl groups in the polymer particles, and the ratio may be varied arbitrary. The N-alkoxymethyl groups which were not used for introduction of amido groups form crosslinks represented by the formula 7 during the reaction for introduction of a compound having an amido group.

When an amide compound having a nonionic group as a substituent on the amido group is introduced, the present polymer particles can be used as nonionic porous particles. Examples of such an amide compound having a nonionic group include organic acid amides such as formamide, lactamide, acetamide, acrylamide, gluconamide, pantotenyl alcohol, benzamide, stearamide, cholamide, polyacrylamide and polyamide resins, acetylated amino sugars such as N-acetoxyglucosamine and N-acetoxygalactosamine, urea, N-methylolurea and uridine.

In particular, when a compound having more than one amido group such as urea is introduced into the present polymer particles in a ratio (molar ratio) of from 1:0.1 to 1:1 in relation to the N-alkoxymethyl groups in the present polymer particles, the present polymer particles are porous particles having both high hydrophilicity and high mechanical strength imparted by formation of crosslinks in the particles, which are useful as a packing for liquid chromatography. Such particles are especially useful as chromatography supports for desalting having high hydrophilicity and high mechanical strength which conventional hydrophilic particles have never had and as supports for normal phase chromatography for analysis of a polyol because they hardly swell in organic solvents.

In the present polymer particles, a compound having an amino group having at least one N—H bond on the nitrogen atom can be easily introduced in the presence of an acid catalyst in an organic solvent. The alkoxy group in the N-alkoxymethylamido group is eliminated, and the nitrogen atom in the amido group in the present polymer particles becomes attached to the amido nitrogen atom in the compound having an amino group via a methylene group to give ion exchange particles. Any compound having an arbitrary substituent can be introduced as long as it is soluble in the organic solvent to be used. Amino groups may be introduced into the present polymer particles in a ratio (molar ratio) of at most 1:1 in relation to the N-alkoxymethyl groups in the present polymer particles, and the ratio may be varied arbitrary with no lower limit. The N-alkoxymethyl groups which were not used for introduction of amido groups form crosslinks represented by the formula 7 during the reaction for introduction of a compound having an amino group. For example, a compound having an amino group may also have an amido group as long as at least either of the groups has an N—H bond. Therefore, such a compound is introduced so that either the amino group or the amido group or both of them forms a bond with an amido nitrogen atom in the present polymer particles via a methylene group.

The compound having an amino group to be introduced into the present polymer particles via N-alkoxymethyl groups may be ammonia, an alkylamine such as methylamine or ethylamine, an aromatic amine such as aniline, diaminobenzene or aminonaphthalene, taurine, an amino acid or a derivative or oligopeptide thereof such as alanine, arginine, asparagine, cysteine, glutamine, gylcine, histidine, leucine, isoleucine, lysine, methionine, phenylalanine, proline, serine, threonine, tryptophane, tyrosine or valine, melamine, benzoguanamine, polyethyleneimine, polyallylamine, polyacrylamide, polyallylamine, polyacrylamide, copolymers with N,N-dimethylaminopropylacrylamide and with 2-acrylamide-2-methylpropanesulfonic acid, Lucifer Yellow, Acid Red or azofloxine.

As a polymerization initiator used in normal suspension polymerization to produce the crosslinked (meth)acrylamide particles of the present invention, an oil-soluble polymerization initiator usually used in radical polymerization of vinyl monomers may be used. For example, oil-soluble azo polymerization initiators such as 2,2'-azobis(4-methoxy-2,4-dimethylvaleronitrile), dimethyl 2,2'-azobis(2-methylpropionate), 1,1'-azobis(cyclohexane-1-carbonitrile), 2,2'-azobis(2,4-dimethylvaleronitrile), 2,2'-azobis(isobutyronitrile), 2,2'-azobis(2-methylbutyronitrile) and oil-soluble organic peroxide polymerization initiators such as 2,2-bis(4,4-di-t-butylperoxycyclohexyl)propane, 1,1-di(t-hexylperoxy)cyclohexane, 1,1-di(t-butylperoxy)cyclohexane, di-(3,5,5-trimethylhexanoyl) peroxide, dilauroyl peroxide, benzoyl peroxide, t-butyl peroxyneodecanoate, t-hexyl peroxypivalate and t-butyl peroxypivalate may be mentioned. In the suspension polymerization, it is preferred to use a polymerization initiator having a half-life of 10 hours at a temperature below 100° C. The polymerization initiator is used in an amount of from 0.01 mol % to 1.0 mol %, preferably from 0.05 mol % to 0.5 mol %, based on the monomers. The polymerization may be initiated by irradiation with UV or radioactive rays, without a polymerization initiator.

In the present invention, a polymeric dispersion stabilizer commonly used to stabilize oily droplets in suspension, such as polyvinyl alcohol, hydroxypropylcellulose, polyvinylpyrrolidone, polyethylene glycol and sodium polyacrylate, may be used in the normal suspension polymerization. It is preferred to use a common nonionic polymer such as polyvinyl alcohol and hydroxypropylcellulose, because if an organic acid polymer were used, it would be necessary to adjust the pH to 4 or above to prevent the aqueous phase from becoming acidic. It is used in amount of from 0.1 wt % to 20 wt %, in terms of concentration in the aqueous phase, preferably from 0.5 wt % to 10 wt % to facilitate the washing after the polymerization.

The polymerization can be initiated by heating when a heat decomposable polymerization initiator is used, by irradiation with radioactive rays at ordinary temperature when radiation polymerization is employed without an initiator, and there is no particular restrictions.

In the normal suspension polymerization with seeding, polystyrene or poly(styrene-acrylate) copolymer particles or methacrylate particles obtained by soap-free emulsion polymerization or dispersion polymerization used for production of monodisperse particles may be used. Especially, the seed polymer particles disclosed in JP-A-2110-2716 are preferably used in view of swelling and prevention of phase separation between seed polymer particles and the N-alkoxymethyl(meth)acrylamide polymer. The ratio of the seed polymer particles to the monomers is preferably such that at least 10 parts by weight of monomers are used per 1 part by weight of seed particles so that the phase separation between the seed polymer particles and the resulting polymer which affects the morphology of the particles. Though the upper limit is not particularly defined, it is preferred to use at most 10,000 parts by weight of the monomers per 1 part by weight of seed particles. Therefore, the ratio of the seed polymer particles to the monomers used in seed polymerization, which determines the swelling of the seed polymer particles, is not particularly restricted and may be set in accordance with the intended particle size so that the seed particles swell by a factor of at most about 10000 in volume.

In normal suspension polymerization with seeding, a common emulsifier such as sulfonic acid salt or nonionic emulsifier may be used. Examples of the emulsifier include alkyl sulfonic acid salts such as sodium laurylsulfonate and sodium dodecylbenzenesulfonate and nonionic emulsifiers such as polyoxyethylene sorbitan stearate, polyoxyethylene stearyl ether and polyoxyethylene sorbitan monolaurate. In particular, an alkyl sulfonic acid salt and a nonionic emulsifier having an HLB of from 8 to 20 may be used in combination in view of the stabilizing effect on oily droplets. In the case of the combined use, the ratio of a nonionic emulsifier to an alkyl sulfonic acid salt is from 10 wt % to 90 wt %, preferably from 20 wt % to 80 wt %.

When only an alkyl sulfonic acid salt is used as the emulsifier in the normal suspension polymerization with seeding, a compound having higher hydrophobicity than the N-alkoxymethyl(meth)acrylamide may be used to further stabilize oily droplets. Examples of such highly hydrophobic compounds include $C_4$ or higher alcohols such as butanol, pentanol, hexanol, cyclohexanol and octanol, organic acid esters such as butyl acetate, pentyl acetate, hexyl acetate, phenyl acetate, benzyl acetate, ethyl propionate, butyl propionate, methyl benzoate and ethyl benzoate, $C_6$-$C_9$ aromatic compounds such as benzene, toluene and xylene. In view of swelling, it is preferred to use a $C_5$-$C_6$ higher alcohol, a $C_4$-$C_7$ organic acid ester, benzene or toluene in an amount of at least 1 wt %, but not more than necessary, preferably from 1 wt % to 50 wt %, based on the total amount of the monomers.

The polymer particles obtained after the polymerization are washed with an appropriate solvent, usually warm water, to remove the polymeric dispersion stabilizer.

In the second step of the process of the present invention, an organic solvent which is stable against the acid catalyst and unreactive with the N-alkoxymethyl group is preferably used. Examples of the organic solvent include dioxane, tetrahydrofuran, benzene, toluene, xylene, dimethyl sulfoxide, dimethylformamide, higher alcohols such as butanol, pentanol and hexanol, and organic acid esters such as butyl acetate, pentyl acetate, hexyl acetate, phenyl acetate, benzyl acetate, ethyl propionate, butyl propionate, methyl benzoate and ethyl benzoate. In the second step, if necessary, the organic solvent may be used in the form of a mixture with water. In particular, it is preferred to use a solvent with which the polymer particles swell in order to make the polymer particles porous. The amount of the solvent is preferably at least 2 parts by weight, particularly at least 4 parts by weight, based on the polymer particles.

The acid catalyst to be used in the second step of the process of the present invention is preferably a strong acid, though it is not particularly restricted, and it may be, for example, a mineral acid such as hydrochloric acid, sulfuric acid or toluenesulfonic acid or a Lewis acid such as boron trifluoride. The amount is preferably at least 0.01 part by weight, particularly at least 0.1 part by weight, based on the polymer particles, though there are no particular restrictions.

The second step of the process of the present invention can be carried out in the presence of a compound having a N—H containing amido or amino group reactive with the N-alkoxymethyl group to introduce the compound into the present polymer particles. Such a compound may have either an amido group or an amino group or both of them but has to have a N—H bond to be introduced into the present polymer particles after elimination of the alkoxy group. Examples of introducible compounds include organic acid amides such as formamide, lactamide, acetamide, acrylamide, gluconamide, pantotenyl alcohol, benzamide, stearamide, cholamide, polyacrylamide and polyamide resins, acetylated amino sugars such as N-acetoxyglucosamine and N-acetoxygalactosamine, urea, N-methylourea, uridine, ammonia, alkylamines such as methylamine and ethylamine, aromatic amines such as aniline, diaminobenzene and aminonaphthalene, taurine, amino acids and derivatives and oligopeptides thereof such as alanine, arginine, asparagine, cysteine, glutamine, gylcine, histidine, leucine, isoleucine, lysine, methionine, phenylalanine, proline, serine, threonine, tryptophane, tyrosine or valine, adenine, cytosine and guanine and their derivatives, melamine, benzoguanamine, polyethyleneimine, polyallylamine, polyacrylamide, polyallylamine, polyacrylamide, copolymers with N,N-dimethylaminopropylacrylamide and with 2-acrylamide-2-methylpropanesulfonic acid, Lucifer Yellow, Acid Red and azofloxine. These introducible compounds may be used in any amount so as to meet the purpose as long as they dissolve in organic solvents.

The progress of the second step of the process of the present invention can be determined by choosing appropriate reaction temperature and reaction time in accordance with the acid to be used and its amount and measuring the alcohol resulting from the eliminated alkoxy group.

The acid catalyst, the organic solvent and the like can be removed easily from the resulting crosslinked (meth)acrylamide particles by washing the particles with warm water.

According to the present invention, it is possible to produce crosslinked (meth)acrylamide particles by normal suspension polymerization with easy particle size control. Especially, the use of the seeding technique makes it possible to easily produce porous particles having a monodisperse particle size distribution. The present invention makes it possible to obtain highly crosslinked particles which are mechanically much stronger than conventional polysaccharide particles and acrylamide particles produced by inverse suspension polymerization. The particles with higher mechanical strength can be available in smaller sizes and show excellent properties as a packing for liquid chromatography.

Now, the present invention will be described in further detail with reference to Examples. However, the present invention is by no means restricted to such specific Examples.

EXAMPLE 1

Preparation of Seed Particles

A 500 mL three-necked flask was loaded with 30 g of benzyl methacrylate (Tokyo Kasei Kogyo Co., Ltd.), 1.5 g of 2-ethylhexyl thioglycolate (Tokyo Kasei Kogyo Co., Ltd.), 0.6 g of potassium persulfate (Kishida Chemical Co., Ltd.) and 250 g of Mill-Q water and purged with nitrogen with stirring at room temperature for 3 hours. The flask was put in an oil bath set at 70° C., and polymerization was carried out for 6 hours. The aggregates were collected by filtration as seed particles.

The particle size of the seed particles was found to be 1.1 μm CV 6.8% according to SEM observation. The molecular weight was measured by size exclusion chromatography (hereinafter referred to as SEC) using the following instruments and found to be 7800 in terms of polystyrene. The solid content of the seed particle dispersion was 8.8%.

SEC Measurement Conditions

Column: TSKgel GMHXL 7.8 mmID×30 cm (Tosoh Corporation)
Eluent: Tetrahydrofuran
Feed pump: DP-8020 (Tosoh Corporation)
Detector: UV-8020 set at a wavelength of 254 nm (Tosoh Corporation)
Standard sample: Standard polystyrene (Tosoh Corporation)
Feed rate: 1.0 mL/min
Sample concentration: 1 mg/mL (in THF)

Preparation of N-alkoxymethylacrylamide Particles by Polymerization 298.5 g of N-butoxymethylacrylamide (Wako Pure Chemical Industries, Ltd.), 1.5 g of ethylene glycol dimethacrylate (Tokyo Kasei Kogyo Co., Ltd.), 60 g of 1-pentanol (Kishida Chemical Co., Ltd.), 0.46 g of V-65 (polymerization initiator, Wako Pure Chemical Industries, Ltd.) and 1.8 g of sodium laurylsulfonate (Tokyo Kasei Kogyo Co., Ltd.) were weighed out in a 1 L beaker, then mixed well with stirring and emulsified in 600 mL of ion-exchanged water by means of an ultrasonic homogenizer. To the resulting emulsion, 0.182 g (on a solid basis) of the seed particles obtained and 600 mL of 4% aqueous polyvinyl alcohol (Kuraray Co., Ltd., product name: POVAL 224) were added and stirred sufficiently for 3 minutes.

The resulting suspension was transferred into a 3 L separable flask and gently stirred with a stirring blade at 100 rpm at room temperature for 12 hours. It was confirmed by microscopy that the seed particles were swollen with the monomer mixture to about 13 μm.

The separable flask was put in an oil bath set at 65° C., and polymerization was carried out for 3 hours with stirring, until the disappearance of the monomers was confirmed by gas chromatography using an OV-17 column (Gasukuro Kogyo, Inc.). After the polymerization, the product was washed with warm water to give polymer particles. The recovery weight was 477 g, and the water content was 41%.

Second Step

The polymer particles obtained were dried in vacuo at 40° C. overnight. 50 g of the dried polymer particles and 340 g of 1,4-dioxane (Wako Pure Chemical Industries, Ltd.) were loaded into a 500 mL separable flask and stirred in an oil bath set at 40° C. 0.5 mL of boron trifluoride ethyl ether complex (Kishida Chemical Co., Ltd.) was put into the flask, and the resulting mixture was stirred for 1 hour, and after the oil bath temperature was elevated to 70° C., stirred for another 1 hour.

The resulting hydrophilic particles were washed with warm water to obtain hydrophilic porous particles.

The hydrophilic porous particles were packed into a 6.0 mm ID×15 cm column, and pore characterization was done by size exclusion chromatography using polyethylene glycol (hereinafter referred to as PEG) as the standard sample. The hydrophilicity was compared with that of conventional hydrophilic particles in terms of benzyl alcohol retention. The mechanical strength was determined by measuring the feed pressure at linearly varying flow rates of pure water through the packed column.

Figure 1:
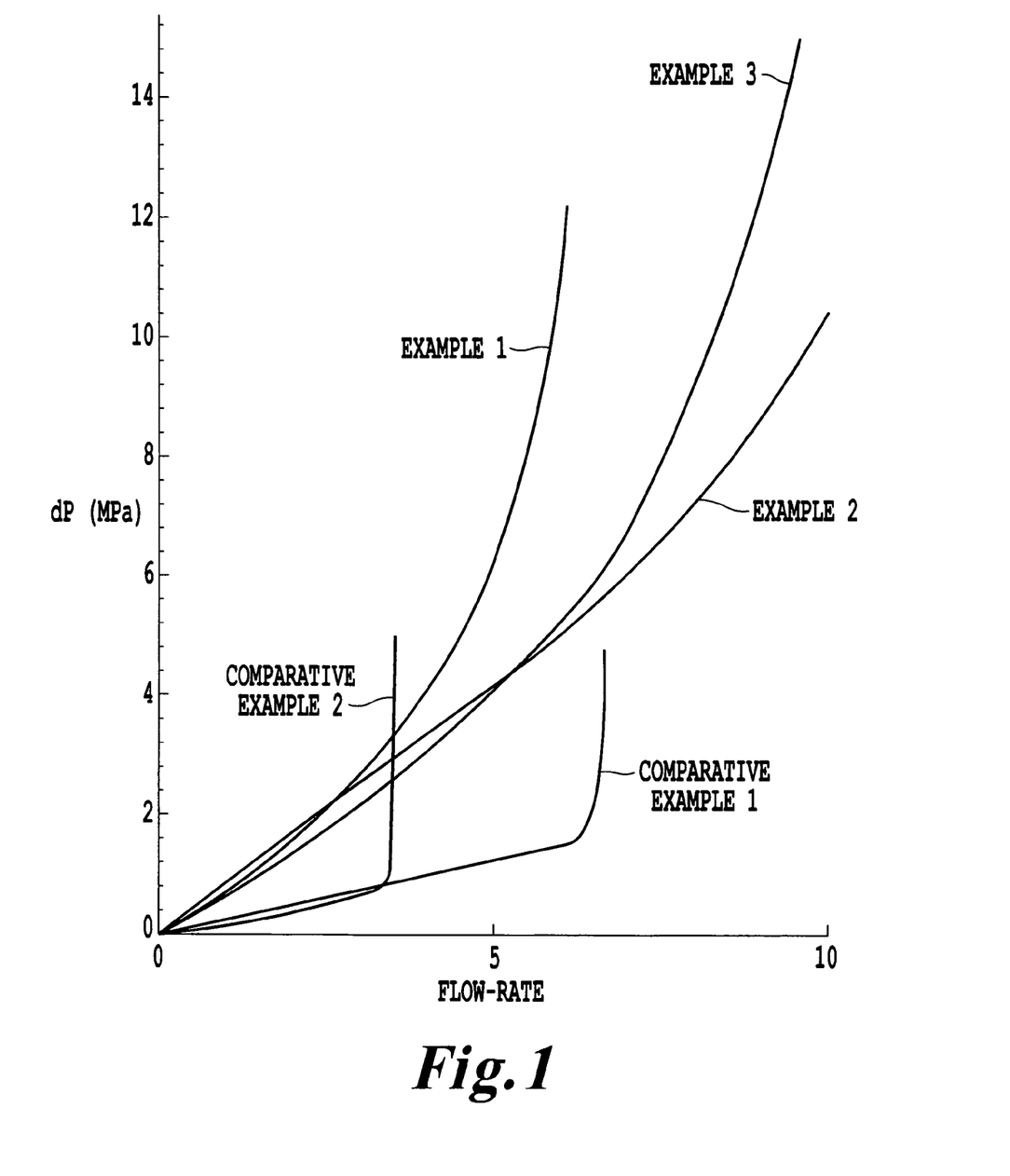
FIG. 1 shows the change in feed pressure with flow rate in the column.

Conditions for Pore Characterization
Column: 6.0 mm ID×15 cm
Eluent: Ion-exchange water
Flow rate] 0.5 mL/min
Feed pump: DP-8020 (Tosoh Corporation)
Detector: RI-8020 (Tosoh Corporation)
Samples: Ethylene glycol, polyethylene glycol (molecular weights 200, 300, 600, 1000, 3000, 6000, Wako Pure Chemical Industries, Ltd.)
Measurement of molecular-weight exclusion limit: the molecular weight at the actual elution volume for PEG 6000 on the straight line in a plot of elution volume vs molecular weight for PEGs 200, 300 and 600
Estimated porosity: (Elution volume for ethylene glycol–Elution volume for PEG 6000 )/(Column volume–Elution volume for PEG 6000)
Conditions for Measurement of Hydrophobicity
The same as those for pore characterization except for the sample
Sample: Ethylene glycol, benzyl alcohol
Index of hydrophobicity: Elution volume for benzyl alcohol/Elution volume for ethylene glycol
Conditions for Measurement of Mechanical Strength (Feed Pressure)
Column: 4.6 mm ID×10 cm
Feed fluid: Ion-exchanged water
Flow rate gradient: linear gradient from 0.2 mL/min to 10.2 mL/min
Feed pump: CCPM-II
Detection: Calculated from the readings on the feed pump gauge
Strength: approximated at the feed pressure value at which the feed pressure begins to deviate from a linear correlation with the flow rate (inflection point)
Table 1 shows the results of the measurements of the molecular-weight exclusion limit, pore volume and hydrophobicity, and FIG. 1 shows the results of measurement of the mechanical strength. Though the hydrophobicity was a little high, the mechanical strength was at such a high level that the particles did not deform at around 6 MPa or below.

TABLE 1

|  | Example 1 | Example 2 | Example 3 | Comparative Example 1 | Comparative Example 2 |
|---|---|---|---|---|---|
| Molecular-weight exclusion limit*1 | 3000 | 780 | 3000 | 630 | 1590 |
| Porosity*2 | 0.58 | 0.37 | 0.64 | 0.60 | 0.74 |
| Benzyl alcohol retention*3 | 2.99 | 6.58 | 1.99 | 1.29 | 1.29 |

*1 Molecular weight in terms of PEG
*2 (Elution volume for ethylene glycol − Elution volume for excluded PEG)
*3 Elution volume for benzyl alcohol/Elution volume for ethylene glycol

EXAMPLE 2

The procedure in Example 1 was followed except that 285.0 g of N-butoxymethylacrylamide (Wako Pure Chemical Industries, Ltd.) and 15 g of ethylene glycol dimethacrylate (Tokyo Kasei Kogyo Co., Ltd.) were used to obtain crosslinked particles.

The pore characteristics, hydrophobicity and mechanical strength of the resulting crosslinked particles were measured in the same manner as in Example 1. They were highly hydrophobic and had smaller pore sizes. The mechanical strength was so high that they did not deform within the measure range (up to 10 MPa).

EXAMPLE 3

The second step was carried out as described below using the N-alkoxymethylacrylamide particles prepared in Example 1.

Second Step 85 g of the hydrated polymer particles (dry weight 50 g), 9.4 g of urea, 4.25 g of paratoluenesulfonic acid monohydrate (Wako Pure Chemical Industries, Ltd.) and 340 g of dimethyl sulfoxide (Kishida Chemical Co., Ltd.) were loaded into a 500 mL separable flask and stirred in an oil bath set at 90° C. The resulting crosslinked hydrophilic particles were washed with warm water to obtain crosslinked particles.

The pore characteristics, hydrophobicity and mechanical strength of the resulting crosslinked particles were measured in the same manner as in Example 1. They were highly hydrophobic and had smaller pore sizes. The mechanical strength was so high that they did not deform within the measure range (up to 10 MPa). Table 1 shows the results of the measurements of the molecular-weight exclusion limit, pore volume and hydrophobicity, and FIG. 1 shows the results of measurement of the mechanical strength. Though the hydrophobicity was a little high, the mechanical strength was so high, but a slight pressure increase due to deformation was observed at around 8 MPa.

EXAMPLE 4

Preparation of N-alkoxymethlacrylamide Particles by Polymerization

The procedure in Example 1 was followed except that 294.0 g of N-butoxymethylacrylamide (Wako Pure Chemical Industries, Ltd.), 4.0 g of ethylene glycol dimethacrylate (Tokyo Kasei Kogyo Co., Ltd.) and 30 g of 1-hexanol (Kishida Chemical Co., Ltd.) were used to obtain polymer particles.

Second Step 16.7 g of the hydrated polymer particles (dry weight 10 g), 2.5 g of ethylamine hydrochloride (Tokyo Kasei Kogyo Co., Ltd.), 1 mL of 60% aqueous sulfuric acid and 60 mL of dimethyl sulfoxide (Kishida Chemical Co., Ltd.) were loaded into a 200 mL three-necked flask and stirred in an oil bath set at 90° C. for 2 hours. The resulting hydrophilic particles were washed with warn water to obtain 18.1 g of porous anion exchange particles. The crosslinked particles were washed with 0.5 N aqueous NaOH, titrated with 0.5 N hydrochloric acid and, as a result, found to have an ion exchange capacity of 0.25 meq/(particle-mL).

EXAMPLE 5

The second step was carried out as described below using the N-alkoxymethylacrylamide particles prepared in Example 4.

Second Step 16.7 g of the hydrated polymer particles (dry weight 10 g), 2.25 g of taurine (Wako Pure Chemical Industries, Ltd.), 1 mL of 60% aqueous sulfuric acid, 55 mL of dimethyl sulfoxide (Kishida Chemical Co., Ltd.) and 5 mL of distilled water were loaded into a 200 mL three-necked flask and stirred in an oil bath set at 90° C. for 2 hours. The resulting particles were washed with warm water to obtain 16.1 g of betaine-type porous ion exchange particles. The crosslinked particles were washed with 0.5 N HCl, titrated with 0.1 NaOH and, as a result, found to have an ion exchange capacity of 0.08 meq/ (particle-mL).

EXAMPLE 6

The procedure in Example 6 was followed except that the N-alkoxymethylacrylamide particles obtained in Example 4, 2.5 g of glycine as the amino compound and 2 mL of 60% aqueous sulfuric acid were used in the second step. The resulting crosslinked particles were washed with 0.5 N HCl, titrated with 0.1 N NaOH and, as a result, found to have ion exchange capacity of 0.07 meq/(particle-mL).

EXAMPLE 7

Preparation of Acrylamide-2-acrylamide-2-methylpropanesulfonic Acid Copolymer 3 g of acrylamide (Aldrich), 7 g of 2-acrylamide-2-methylpropanesulfonic acid (Aldrich) and 0.1 g of potassium persulfate (Kishida Chemical Co., Ltd.) were dissolved in ion-exchanged water, made up to 100 mL and transferred into a recovery flask, and polymerization was carried out in a nitrogen stream at 70° C. for 16 hours.

Second Step

Then, the procedure in the second step in Example 3 was followed except that the N-alkoxymethylacrylamide particles obtained in Example 4 and 5 mL of acrylamide-2-acrylamide-2-methylpropanesulfocnic acid copolymer solution as the amido compound were used. The resulting crosslinked particles were washed with 0.5 N HCl, titrated with 0.1 N NaOH and, as a result, found to have ion exchange capacity of 0.013 meq/(particle-mL).

EXAMPLE 8

The particles obtained in Example 3 were packed into a 10 mmID×15 cm liquid chromatography column and used for desalting chromatography under the following chromatography conditions.
Eluent: 50 mmol/L phosphate buffer pH 6.5
Flow rate: 3 mL/min
Temp.: 4° C.
Samples: 10 mg/mL Ovalbumin (Sigma), 0.5 mol/L NaCl and 50 mmol/L phosphate buffer pH 6.5
Sample volume: 1 mL, 2 mL, 3 mL and 4 mL
Instrument:
Feed pump: DP-8020 (Tosoh Corporation)
Column oven CO-8020 (Tosoh Corporation)
Detector: UV-8020 set at a wavelength of 280 nm (Tosoh Corporation)
Gradient Monitor: GM-8010 (Tosoh Corporation)

Figure 2:
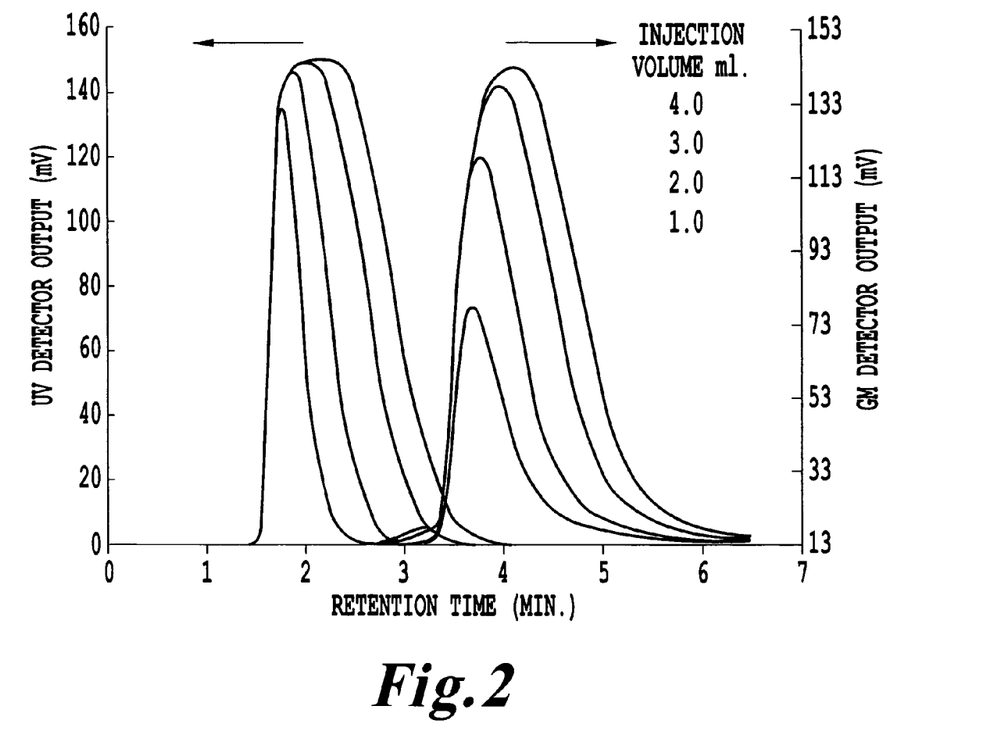
FIG. 2 is a desalting chromatogram of a salt-containing protein solution.

The resulting chromatograms shown in FIG. 2 demonstrate that the protein and salts were separated efficiently.

EXAMPLE 9

The particles obtained in Example 3 were packed into a 4.6 mmID×15 cm liquid chromatography column and used for analysis of polyols by normal phase chromatography under the following chromatography conditions.
Eluent:
1) Acetonitrile/water=7/3
2) Acetonitrile/5 mmol/L phosphate buffer pH 6.5=7/3
Flow rate: 1 mL/min
Temp.: 80° C.
Samples:
Eluent 1) ethylene glycol, glycerol, sorbitol, glucose, saccharose and maltose
Eluent 2) ethylene glycol, glycerol, glucose, glucosamine and galactocuronic acid
Instrument:
Feed pump: DP-8020 (Tosoh Corporation)
Column oven CO-8020 (Tosoh Corporation)
Detector: RI-8022 (Tosoh Corporation)

Figure 3:
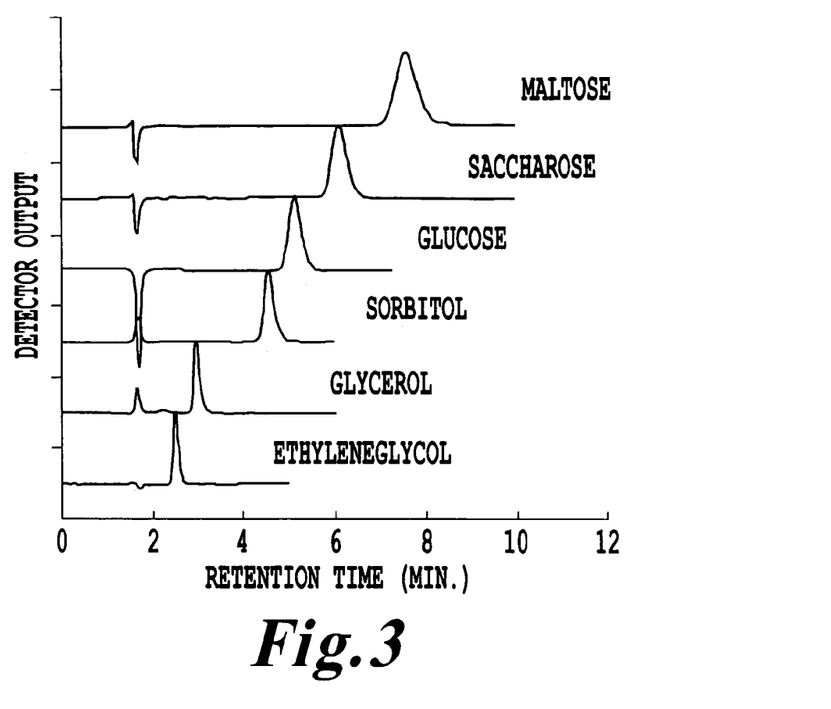
FIG. 3 is a chromatogram of neutral polyols.
Figure 4:
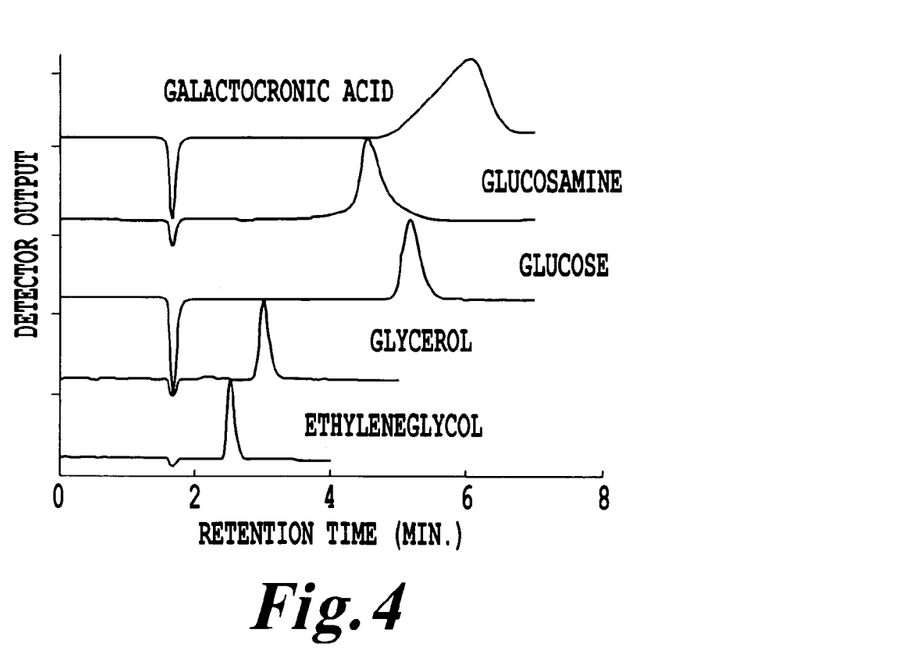
FIG. 4 is a chromatogram of basic, neutral and acidic sugars analyzed simultaneously.

The resulting chromatograms shown in FIGS. 3 and 4 demonstrate that the polyols were separated efficiently. Thus, basic sugars, neutral sugars and acidic sugars were able to be analyzed simultaneously though they are difficult to analyze simultaneously when conventional silica packings are used.

COMPARATIVE EXAMPLE 1

The polyacrylamide manufactured by Pierce under the product name D-Salt Polyacrylamide 1800 was taken out from the column and analyzed in the same manner as in Example 1. It had a large pore volume and little hydrophobicity, but the mechanical strength was so low that it crushed at about 1.7 MPa, though the fluid resistance was small probably due to its large particle size.

COMPARATIVE EXAMPLE 2

The same measurements as in Example 1 were carried out using crosslinked dextran particles manufactured by Amersham under the product name of Sephadex G25 Superfine. It had a large pore volume and little hydrophobicity, but the mechanical strength was so low that it crushed at about 0.95 MPa, though the fluid resistance was small probably due to its large particle size.

The crosslinked (meth)acrylamide particles of the present invention are mechanically stronger than conventional particles and have various possible uses in binders, coating materials and cosmetics and as supports for immunodiagnosis and chromatography packing. Especially, polymer particles characterized by low hydrophobicity and high mechanical strength show excellent performance as a liquid chromatography packing.

The invention claimed is:

1. Crosslinked (meth)acrylamide particles in the form of polymer particles having particle sizes of from 1 to 1000 μm, comprising:
units derived from an N-alkoxymethyl(meth)acrylamide monomer represented by the formula 2

Formula 2

(wherein X is hydrogen or a methyl group, $R_1$ is an alkyl group having at least 4 carbon atoms), and
units derived from a polyfunctional unsaturated monomer copolymerizable with the monomer represented by the formula 2,
wherein a substituent represented by the formula 3

Formula 3

(wherein $R_2$ is H, $R_3$ is $NH_2$, or $R_3$ may be a structural unit derived from the N-alkoxymethyl(meth)-acrylamide monomer and bonded to the nitrogen atom in another structural unit derived from the N-alkoxymethyl(meth)acrylamide monomer via a methylene group, and A is a polymer particle) is introduced into the units derived from the N-alkoxymethyl (meth)acrylamide monomer represented by the formula 2.

2. The crosslinked (meth)acrylamide particles according to claim 1, wherein the molar ratio of the units derived from the N-alkoxymethyl(meth)acrylamide monomer represented by the formula 2 and the units derived from the polyfunctional unsaturated monomer copolymerizable with the monomer represented by the formula 2 is within the range of from 99.99:0.01 to 50:50.

3. The crosslinked (meth)acrylamide particles according to claim 1, which have such a pore size that the molecular-weight exclusion limit based on polyethylene glycol is at most 5000.

4. A process for producing the crosslinked (meth)acrylamide particles as defined in claim 1, which comprises:
(1) a step of polymerizing an oil-soluble N-alkoxymethyl (meth)acrylamide monomer represented by the formula 2 and a polyfunctional unsaturated monomer copolymerizable with the monomer represented by the formula 2 suspended in an aqueous phase containing a polymeric dispersion stabilizer to form polymer particles, and
(2) a step of treating a dispersion of the polymer particles obtained in the step (1) in an organic solvent containing urea with an acid catalyst to introduce substituents represented by the formula 3 into units derived from the monomer represented by the formula 2.

5. The process for producing crosslinked (meth)acrylamide particles according to claim 4, wherein in the step (1), a mixture containing the oil-soluble N-alkoxymethyl(meth) acrylamide and the polyfunctional unsaturated monomer copolymerizable with the N-alkoxymethyl(meth)acrylamide are emulsified in water by using an emulsifier, and then seed polymer particles are added to the resulting emulsion to form oily monomer droplets having a monodisperse particle size distribution through adsorption of the monomers into the seed polymer particles, and the polymerization is carried out.

6. The process for producing crosslinked (meth)acrylamide particles according to claim 5, wherein at least one organic solvent selected from the group consisting of higher alcohols having at least 4 carbon atoms and organic acid esters thereof and aromatic compounds having from 6 to 9 carbon atoms is used as a stabilizer for the oily monomer droplets having a monodisperse particle size distribution in an amount of at least 1 wt % based on the monomers.

7. The process for producing crosslinked (meth)acrylamide particles according to claim 5, wherein as the emulsifier, an alkyl sulfonic acid salt, an alkylbenzenesulfonic acid salt or an alkyl ether sulfate salt is used in an amount of from 0.1 to 5 wt % based on the monomers.

8. The process for producing crosslinked (meth)acrylamide particles according to claim 5, wherein the acid catalyst is at least one acid selected from the group consisting of mineral acids such as hydrochloric acid, phosphoric acid and sulfuric acid, organic acids such as alkyl sulfonic acids, benzenesulfonic acid, toluenesulfonic acid, oxalic acid, acetic acid and maleic acid and Lewis acids such as boron trifluoride.

9. A packed column consisting of a liquid chromatography column filled with the crosslinked (meth)acrylamide particles as defined in claim 1.

10. The process for producing crosslinked (meth)acrylamide particles according to claim 4, wherein the acid catalyst is at least one acid selected from the group consisting of mineral acids such as hydrochloric acid, phosphoric acid and sulfuric acid, organic acids such as alkyl sulfonic acids, benzenesulfonic acid, toluenesulfonic acid, oxalic acid, acetic acid and maleic acid and Lewis acids such as boron trifluoride.

11. A process for producing the crosslinked (meth)acrylamide particles as defined in claim 2, which comprises:
(1) a step of polymerizing an oil-soluble N-alkoxymethyl (meth)acrylamide monomer represented by the formula 2 and a polyfunctional unsaturated monomer copolymerizable with the monomer represented by the formula 2 suspended in an aqueous phase containing a polymeric dispersion stabilizer to form polymer particles, and
(2) a step of treating a dispersion of the polymer particles obtained in the step (1) in an organic solvent containing urea with an acid catalyst to introduce substituents represented by the formula 3 into units derived from the monomer represented by the formula 2.

12. The process for producing crosslinked (meth)acrylamide particles according to claim 11, wherein in the step (1), a mixture containing the oil-soluble N-alkoxymethyl(meth) acrylamide and the polyfunctional unsaturated monomer copolymerizable with the N-alkoxymethyl(meth)acrylamide are emulsified in water by using an emulsifier, and then seed polymer particles are added to the resulting emulsion to form oily monomer droplets having a monodisperse particle size distribution through adsorption of the monomers into the seed polymer particles, and the polymerization is carried out.

13. The process for producing crosslinked (meth)acrylamide particles according to claim 12, wherein at least one organic solvent selected from the group consisting of higher alcohols having at least 4 carbon atoms and organic acid esters thereof and aromatic compounds having from 6 to 9 carbon atoms is used as a stabilizer for the oily monomer droplets having a monodisperse particle size distribution in an amount of at least 1 wt % based on the monomers.

14. The process for producing crosslinked (meth)acrylamide particles according to claim 12, wherein as the emulsifier, an alkyl sulfonic acid salt, an alkylbenzenesulfonic acid salt or an alkyl ether sulfate salt is used in an amount of from 0.1 to 5 wt % based on the monomers.

15. The process for producing crosslinked (meth)acrylamide particles according to claim 12, wherein the acid catalyst is at least one acid selected from the group consisting of mineral acids such as hydrochloric acid, phosphoric acid and sulfuric acid, organic acids such as alkyl sulfonic acids, benzenesulfonic acid, toluenesulfonic acid, oxalic acid, acetic acid and maleic acid and Lewis acids such as boron trifluoride.

16. The process for producing crosslinked (meth)acrylamide particles according to claim 11, wherein the acid catalyst is at least one acid selected from the group consisting of mineral acids such as hydrochloric acid, phosphoric acid and sulfuric acid, organic acids such as alkyl sulfonic acids, benzenesulfonic acid, toluenesulfonic acid, oxalic acid, acetic acid and maleic acid and Lewis acids such as boron trifluoride.

17. A process for producing the crosslinked (meth)acrylamide particles as defined in claim 3, which comprises:
   (1) a step of polymerizing an oil-soluble N-alkoxymethyl (meth)acrylamide monomer represented by the formula 2 and a polyfunctional unsaturated monomer copolymerizable with the monomer represented by the formula 2 suspended in an aqueous phase containing a polymeric dispersion stabilizer to form polymer particles, and
   (2) a step of treating a dispersion of the polymer particles obtained in the step (1) in an organic solvent containing urea with an acid catalyst to introduce substituents represented by the formula 3 into units derived from the monomer represented by the formula 2.

18. The process for producing crosslinked (meth)acrylamide particles according to claim 17, wherein in the step (1), a mixture containing the oil-soluble N-alkoxymethyl (meth)acrylamide and the polyfunctional unsaturated monomer copolymerizable with the N-alkoxymethyl(meth)acrylamide are emulsified in water by using an emulsifier, and then seed polymer particles are added to the resulting emulsion to form oily monomer droplets having a monodisperse particle size distribution through adsorption of the monomers into the seed polymer particles, and the polymerization is carried out.

19. The process for producing crosslinked (meth)acrylamide particles according to claim 18, wherein at least one organic solvent selected from the group consisting of higher alcohols having at least 4 carbon atoms and organic acid esters thereof and aromatic compounds having from 6 to 9 carbon atoms is used as a stabilizer for the oily monomer droplets having a monodisperse particle size distribution in an amount of at least 1 wt % based on the monomers.

20. The process for producing crosslinked (meth)acrylamide particles according to claim 18, wherein as the emulsifier, an alkyl sulfonic acid salt, an alkylbenzenesulfonic acid salt or an alkyl ether sulfate salt is used in an amount of from 0.1 to 5 wt % based on the monomers.

21. The process for producing crosslinked (meth)acrylamide particles according to claim 18, wherein the acid catalyst is at least one acid selected from the group consisting of mineral acids such as hydrochloric acid, phosphoric acid and sulfuric acid, organic acids such as alkyl sulfonic acids, benzenesulfonic acid, toluenesulfonic acid, oxalic acid, acetic acid and maleic acid and Lewis acids such as boron trifluoride.

22. The process for producing crosslinked (meth)acrylamide particles according to claim 17, wherein the acid catalyst is at least one acid selected from the group consisting of mineral acids such as hydrochloric acid, phosphoric acid and sulfuric acid, organic acids such as alkyl sulfonic acids, benzenesulfonic acid, toluenesulfonic acid, oxalic acid, acetic acid and maleic acid and Lewis acids such as boron trifluoride.

23. A packed column consisting of a liquid chromatography column filled with the crosslinked (meth)acrylamide particles as defined in claim 2.

24. A packed column consisting of a liquid chromatography column filled with the crosslinked (meth)acrylamide particles as defined in claim 3.

* * * * *

UNITED STATES PATENT AND TRADEMARK OFFICE
CERTIFICATE OF CORRECTION

PATENT NO. : 7,659,348 B2  Page 1 of 1
APPLICATION NO. : 11/247157
DATED : February 9, 2010
INVENTOR(S) : Muranaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Thirtieth Day of November, 2010

David J. Kappos
*Director of the United States Patent and Trademark Office*